April 22, 1969  MICHIO TAMURA ET AL  3,440,080
CATHODE RAY TUBE COLOR SCREEN AND METHOD OF PRODUCING SAME
Filed June 30, 1966
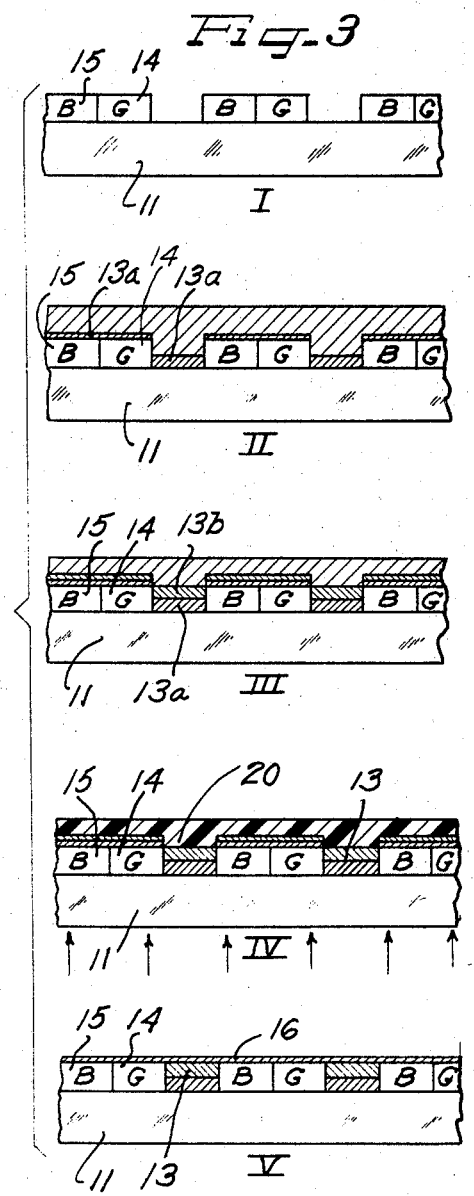
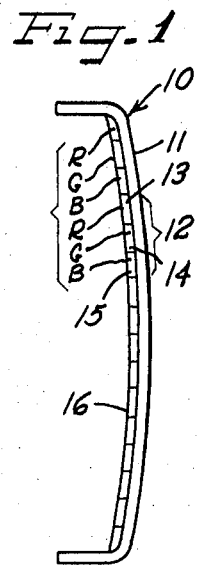
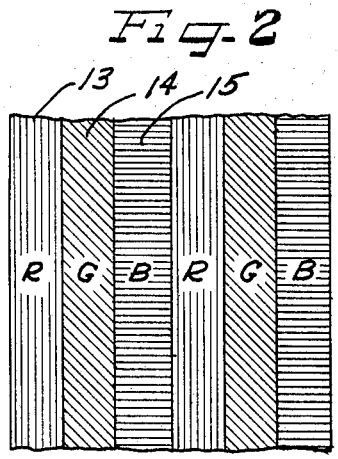
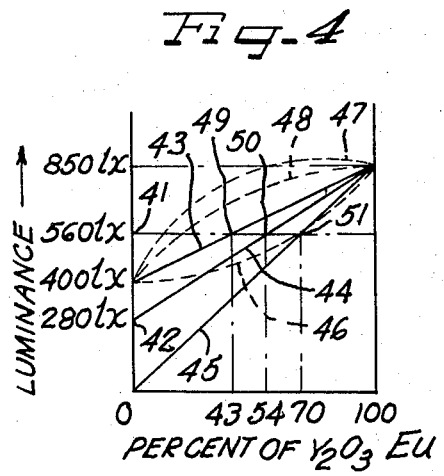
INVENTORS
Michio Tamura
Mitsuyoshi Nakamura
BY  ATTORNEYS

United States Patent Office 3,440,080
Patented Apr. 22, 1969

3,440,080
CATHODE RAY TUBE COLOR SCREEN AND
METHOD OF PRODUCING SAME
Michio Tamura, Fujisawa-shi, and Mitsuyoshi Nakamura, Tokyo, Japan, assignors to Sony Corporation, Tokyo, Japan, a corporation of Japan
Filed June 30, 1966, Ser. No. 561,930
Claims priority, application Japan, July 7, 1965, 40/40,666
Int. Cl. C09k 1/04; H01j 29/32
U.S. Cl. 117—33.5      34 Claims This invention relates generally to a method of producing cathode ray tubes of the multicolored type wherein three primary colors such as red, blue and green, are used to develop substantially the complete spectrum of visible light, and more particularly to a method of producing color cathode ray tubes which utilize rare earth phosphors in combination with luminance control material to produce an elemental color emitting area having improved brightness characteristics as well as having a persistence characteristic which is compatible to the persistent characteristics of elemental areas of different colors associated therewith so as to produce improved white luminance from the screen of a cathode ray tube. Specifically, the present invention is directed to a method of placing red emitting rare earth phosphor on the face of a cathode ray tube and then overlying the rare earth phosphor with a luminance control material of the desired proportion to obtain from the combination improved brightness and persistent characteristics.

Heretofore, red emitting phosphors which were used to produce red light from the face of a cathode ray tube had a relatively low intensity as compared to the intensity of the phosphors used to emit green and blue light. Therefore, in using phosphors such as (ZnCd)S:Ag, ZnS:Ag and $ZnSiO_4$:Mn for emitting red, blue and green light respectively, compensation of one form or another is necessary to provide the desired luminance of each of the phosphors in order to produce white light. One such method of compensation is to increase the intensity of the electron beam which impinges upon the red emitting phosphor, thereby raising the intensity of the red emitted light to that of the green and blue emitted light. Still another method of compensating for the inherent low intensity of the red emitting phosphor, is to add to the green and blue emitting phosphors a light killer such as Ni, Fe or other opaque material for absorbing a portion of the light emitted thereby. This method reduces the intensity of the green and blue phosphors to substantially that of the red emitting phosphor. However, although this method provides suitable means for producing while light on the face of a cathode ray tube it reduces the average intensity of the white light since the green and blue phosphors are retarded so to speak.

It is well known in the art that rare earth phosphors such as $YVO_4$:Eu and $Y_2O_3$:Eu or $GdVO_4$ or $La\ VO_4$ or similar rare earth orthovanadates will produce a color when bombarded by an electron beam, specifically $Y_2O_3$:Eu will produce the color red. Such rare earth phosphors have improved intensity characteristics as compared to the color emitting phosphors used heretofore. However, rare earth phosphor such as $YVO_4$:Eu or $Y_2O_3$:Eu are relatively expensive to manufacture and, therefore, would appreciably increase the manufacturing cost of color cathode ray tubes. Also, the rare earth phosphor $YVO_4$:Eu and $Y_2O_3$:Eu have a relatively short persistence and therefore is not readily compatible with the presently used blue and green phosphors which have a relatively long persistence.

Therefore, one of the primary objects of the present invention is to provide a color emitting phosphor which has the intensity characteristics of a rare earth phosphor and which also has the persistence characteristic of other different color emitting phosphors which are used in combination therewith to produce white light on the face of a cathode ray tube.

Another object of the present invention is to provide a color cathode ray tube which has improved brightness characteristics.

Still another object of the present invention is to provide a method of depositing rare earth phosphor on the face of a cathode ray tube and then integrating the rare earth phosphor with a superimposed luminance control material.

Briefly, the present invention provides a method of producing a color cathode ray tube having a multiplicity of color producing areas each including discrete elemental areas of, for example, red, green and blue light emitting material adjacent one another to produce white light from the combined elemental areas when each of the elemental areas is bombarded by an electron beam of approximately the same intensity. Blue and green emitting phosphors are applied to the interior surface of the screen of a colored cathode ray tube in the usual manner. However, the red emitting phosphor is applied to the interior surface of the screen of the cathode ray tube in a sequence of steps to obtain the desired quantity of rare earth phosphors adjacent the screen and the desired quantity of luminance control material overlying the rare earth phosphor.

Other objects and features will be more fully realized and understood from the following detailed description when taken in conjunction with the accompanying drawings in which like reference numerals throughout the various views of the drawings are intended to designate similar elements or components and wherein:

FIGURE 1 is a fragmentary elevational sectional view of a screen of a cathode ray tube showing discrete elemental areas of light emitting phosphor affixed to the interior surface thereof;

FIGURE 2 is an enlarged fragmentary view showing the particular arrangement of the discrete elemental areas of FIGURE 1;

FIGURE 3 depicts the process sequence, steps I through V, by which the discrete elemental areas are applied to the surface of the screen shown in FIGURE 1; and FIGURE 4 is a graph showing the amount of rare earth phosphor which is to be combined with the luminance control material to obtain the desired intensity of luminance.

Seen in FIGURE 1 is a face plate 10 of a color cathode ray tube. The face plate 10 includes a screen 11 which has a plurality of color producing areas 12. Each of the color producing areas 12 are capable of producing substantially the complete spectrum of visible light. The color producing areas 12 are made up of discrete elemental areas of red, green and blue emitting phosphors indicated by reference numerals 13, 14 and 15 respectively. After the discrete elemental areas 13, 14 and 15 are placed on the screen 11, a metallic layer 16 is placed over the color emitting phosphor.

Seen in FIGURE 2 is the particular arrangement of the elemental areas 13, 14 and 15 as they are placed on the screen 11. Although the elemental areas 13–15 are shown as bars or strips, it is not to be construed in a limiting sense. The elemental areas may take various geometric forms such as circular dots or triangles as may be desired.

As seen on FIGURE 3, the sequential process I through V, used in the manufacture of a color screen 11 of a cathode ray tube is illustrated in accordance with the principles of the present invention.

The first sequential step I, illustrates a conventional blue B and green G emitting phosphor elements 15 and 14 respectively, deposited on the inner surface of screen 11 of a cathode ray tube. The blue emitting phosphor element B may be exemplified by such complexes as ZnS:Ag, while the green emitting phosphor element G may be exemplified by such complexes as $ZnSiO_4$:Mn or (ZnCd)S:Ag. It will be realized, of course, that other suitable color emitting complexes may be used. As has previously been discussed, the color emitting phosphor elements emit their particular color in a predetermined matching luminance, which includes substantially equal intensity and persistent characteristics. These blue and green emitting phosphor elements, 14 and 15, respectively, can be deposited on screen 11 by any suitable method, such as beam-printing or optical-printing techniques.

The second sequential step II, illustrates the sedimentation of a phosphor material 13a from an aqueous suspension, onto the screen 11 having the predeposited blue and green emitting phosphor elements 15 and 14 thereon, in accordance with Stokes' Law;

$$v = \frac{g}{18} \cdot \frac{\delta - P}{n} d^2$$

wherein $v$ is the sedimentation velocity, $g$ is gravity, $n$ is the viscosity coefficient of the suspension, $\delta$ is the specific weight of the phosphor material, $P$ is the specific weight of the suspension and $d$ is the particle size of the phosphor material. It is, therefore, entirely possible to calculate the precise time-interval required for the phosphor material to settle onto the screen. As will be realized, of course, the blue and green emitting phosphor elements were deposited in a predetermined pattern leaving voids therein for a red phosphor material to fill.

The phosphor material 13a is a color emitting material adopted per se to emit a color, such as red, in a greater intensity than that matched by the other phosphor materials (i.e., the blue and green emitting phosphor materials). This phosphor material 13a is a member of the Lanthanide Series or rare-earth group of the Periodic Table of Atoms. The Lanthanide Series generally include those chemical elements whose atomic number is in the range of 58 to 71. Specifically, the preferred complexes are members of the yttrium orthovanadate family of complexes, and the specific preferred number of this group is $Y_2O_3$:Eu, even though other complexes containing a member of the Lanthanide Series are usable. Generally, the color emitting complexes formed with a member of the rare-earth group exhibit a greater intensity of color but for a shorter duration than more conventional phosphor materials which are presently used on color cathode ray tubes.

The third sequential step III illustrates the sedimentation of a luminance control material 13b, substantially forming a coextensive superimposed coating or layer onto the phosphor material 13a. Again, the precise time-internal necessary for the luminance control material to settle can readily be calculated by the use of previously mentioned and explained Stokes' Law. In this regard, it is pointed out that while it is possible to form a common suspension containing both the phosphor material 13a and the luminance control material 13b and allow substantially simultaneous sedimentation to take place, substantially improved results are obtained when the phosphor material 13a is allowed to settle first onto the screen surface and the luminance control material 13b integrated therewith to form a superimposed coating. The apparent explanation for the improved results using the sequential process here described is that better results are obtainable when the phosphor material is in actual contact with the face plate of the screen and the luminance control material forms a coating thereon. Thus, if the substantially simultaneous sedimentation process is used, it has been found that the luminance control material was predominantly in contact with the face plate of the screen, while the phosphor material formed a superimposed coating thereon, as apparently, the phosphor materials of the present invention have a generally lower specific weight and somewhat smaller particle size than the luminance control material thereby causing the phosphor material to settle at a relatively slower velocity than the luminance control material in accordance with Stokes' Law.

The luminance control material 13b may be a color emitting phosphor or a non-luminous material. When it is a color emitting material, preferably it emits the same color, but at a relatively lesser intensity and for a prolonged duration, than that emitted by the phosphor material 13a. Examples of such luminance control materials are, $Zn_3(PO_4)_2$:Mn, (ZnCd)S:Ag, etc., while an example of a compatible non-luminous control material is $$Zn_3(PO_4)_2$$

i.e. a conventional color emitting phosphor with its color emitting activator removed.

The fourth sequential process step IV, illustrates forming a covering of a photosensitive organic solid-film-forming resin 20, such as commercially available KPR, above the color emitting materials 15 14 and 13 (material 13 is the integrated combination of the phosphor material 13a and luminance control material 13b). This photosensitive organic resin binder is hardened by direct exposure to an actinic light source. Preferably the actinic light strikes the photosensitive resin 20 from the outer surface of screen 11, as indicated by the arrows, so as to selectively bind the individual color emitting materials to the screen, while maintaining the excess of phosphor material 13a and luminance control material 13b that has settled onto the blue and green emitting phosphor elements 14 and 15 in a removable sedimentation. The excess of the photosensitive organic resin binder 20, together with the removable sedimentation of materials 13a and 13b above the blue and green emitting phosphor materials, is removed by a suitable aqueous solvent, such as water.

In the final sequential step V, a protective metallic back-up layer 16 is suitably superimposed on the bound color emitting materials. Generally, an aluminum coating is preferred.

Examples of preferred suspensions for use in the sedimentation processes II and III of phosphor material 13a and luminance control material 13b are set out below, however, it will be realized that these are given merely for the purpose of illustration and are not intended to limit the invention in any way.

*Example I*

An electrolyte containing 80 cc. of 0.1 N barium nitrate, $Ba(NO_3)_2$ and 1920 cc. of water was formulated. A first suspension containing 10 cc. of potassium silicate, $K_2SiO_3$ solution (20% $SiO_2$) commonly referred to as waterglass, 400 cc. of water and 0.5 gram of $Y_2O_3$:Eu was mixed with the electrolyte and poured onto a face plate of a cathode ray tube. A time-interval of approximately 2 to 5 minutes was allowed for the sedimentation of the $Y_2O_3$:Eu complex.

A second suspension containing 2 cc. of potassium silicate ($K_2SiO_3$) solution (20% $SiO_2$), 200 cc. of water and 0.5 gram of $Zn_3(PO_4)_2$:Mn was prepared and poured on top of the first suspension on the face plate. Again a sufficient time-interval of approximately 2 to 5 minutes was allowed for the sedimentation of the luminance control material. Then both of the suspensions were removed, by pouring, and the sediments deposited carefully dried on the face plate. A coating of KPR photosensitive solid-film-forming organic binder resins was applied to the dried sediments and the resin was then exposed to actinic light from the convex side of the face plate, thereby hardening the resin above the sediment. The resin was then washed with water to remove any excess of sediment.

Example II

The procedure of Example I was substantially repeated except that the electrolyte contained 80 cc. of 0.1 N barium nitrate, i.e. $Ba(NO_3)_2$ and 1320 cc. of water; while the first suspension contained 10 cc. of $K_2SiO_3$ solution (20% $SiO_2$), 300 cc. of water and 0.5 gram of $Y_2O_3$:Eu and the second suspension was identical to that described in Example I.

After the washing step to obtain the bound color emitting material, an aluminum back-up coating was provided in accordance with the general practice of the art.

Referring now to FIGURE 4, a graph showing the relationship between the percent by weight of $Y_2O_3$:Eu and luminance, in units of luxes, is illustrated. Point 41 indicates the desired luminance as being substantially 560 luxes, while point 42 indicates that the luminance emitted by $Zn_3(PO_4)_2$:Mn is substantially 280 luxes when the percentages of $Y_2O_3$:Eu is substantially zero. Straight line 44 indicates the increase of luminance with the increase, in percent by weight, of $Y_2O_3$:Eu, so that at 100% $Y_2O_3$:Eu the luminance is substantially equal to 850 luxes. Line 43 indicates the proportionate increase in luminance of (ZnCd)S:Ag with the increased addition of $Y_2O_3$:Eu. Line 45 indicates the luminance characteristics of the combination of $Y_2O_3$:Eu and a non-luminous material such as $Zn_3(PO_4)_2$. Curve 47 indicates the luminance characteristic of $Zn_3(PO_4)_2$:Mn and $Y_2O_3$:Eu similar to curve 42 except that the $Zn_3(PO_4)$:Mn was deposited first, i.e. the luminance control material was in immediate contact with the inner face of the cathode ray tube and the phosphor material ($Y_2O_3$:Eu) was superimposed thereon. Curve 47 indicates the luminance characteristic of the color emitting material formed in accordance with the procedure of Example I, while curve 48 showed the luminance characteristic of a substantially similar material, except that the particle size of $Y_2O_3$:Eu was larger.

From the graph of FIG. 4, it is possible to readily determine what amount of the rare-earth activated phosphor that must be combined with the luminance control material, such as (ZnCd)S:Ag, $Zn_3(PO_4)_2$:Mn or $Zn_3(PO_4)_2$, to effect a matching luminance to that desired, i.e. 560 luxes. Thus, point 49 indicates that it is necessary to combine substantially 43% $Y_2O_3$:Eu by weight, with (ZnCd)S:Ag in order to obtain a matching luminance of 560 luxes. Point 50 indicates that it is necessary to combine substantially 54% $Y_2O_3$:Eu by weight with $Zn_3(PO_4)_2$:Mn to obtain the desired 560 luxes. Point 51 indicates that it is necessary to combine 70% $Y_2O_3$:Eu by weight with a non-luminous material such as $Zn_3(PO_4)_2$ to obtain the desired luminance of 560 luxes.

Th term luminance as used in the specification and claims includes a combination of fluorescence and phosphorescence characteristics of light, and in addition include intensity and duration thereof and the response or sensitivity of the human eye thereto. This characteristic of color emitting materials is well understood by those in the art and is readily ascertainable by available optical instruments which compare the desired characteristics to abstract standards, such as time and wavelength.

We claim:
1. The method of manufacturing a given color-emitting phosphor element for use in a pattern on a luminescent screen containing a plurality of different color-emitting phosphor elements in predetermined matching illuminants in a selective pattern on an inner surface of said screen, comprising forming a first coating on the inner surface of said screen, said coating predominantly containing a phosphor material that substantially emits a greater given color intensity than that matched by said different phosphor elements, forming a second coating of a predominantly luminance control material substantially coextensively superimposed on said first coating to effect cooperation with said first coating a resultant luminance that is matched in predetermined luminance by said different phosphor elements.

2. The method of claim 1 wherein a photosensitive organic solid-film-forming resin is super-imposed on the second coating.

3. The method of claim 2 wherein the photosensitive organic resin is hardened by a time-exposure to an actinic light source.

4. The method of claim 1 wherein the first coating predominantly contains a member of the rare-earth group.

5. The method of claim 1 wherein the first coating predominantly contains a member of the Lanthanide Series in the Periodic Table of Atoms.

6. The method of claim 1 wherein the first coating predominantly contains a member of the Periodic Table of Atoms having an atomic weight in the range of 58 to 71.

7. The method of claim 1 wherein the first coating predominantly contains yttrium orthovanadate complex.

8. The method of claim 1 wherein the first coating predominantly contains $Y_2O_3$:Eu.

9. The method of claim 1 wherein the ratio of the first coating phosphor element to the second coating luminous control material is substantially in the range of 1:3 to 4:1.

10. The method of claim 1 wherein the given color-emitting phosphor element contains substantially 40 to 50% $Y_2O_3$:Eu and substantially 50 to 60% (ZnCd)S:Ag.

11. The method of claim 1 wherein the given color-emitting phosphor element contains substantially 50 to 60% $Y_2O_3$:Eu and substantially 40 to 50%

$$Zn_3(PO_4)_2:Mn$$

12. The method of claim 1 wherein the given color-emitting phosphor element contains substantially 65 to 75% $Y_2O_3$:Eu and substantially 25 to 35% of a compatible non-luminous material.

13. A method of producing a phosphor element for emitting a given color in a pattern with at least one other phosphor element which emits a different color from such given color but in predetermined matching luminance, which comprises, providing in the form of an integrated coherent combination, a first phosphor material that is per se adapted to emit a greater given color intensity than that matched by said other phosphor element, and integrating therewith a second substantially coextensive cooperating luminance control material emitting the given color in a different luminance to effect a resultant luminance that is matched in predetermined luminance by such other phosphor element.

14. The method of claim 13 wherein the first phosphor material has an atomic weight substantially in the range of 58 to 71.

15. A method of producing a given color-emitting phosphor element for use in a pattern on the inner surface of a luminescent screen containing a plurality of different color emitting phosphor elements in a predetermined pattern, said colors having a predetermined matching luminance, comprising the steps of (1) selectively depositing said different color emitting phosphor elements in a predetermined pattern on said inner surface, (2) sequentially (a) formulating a first aqueous suspension of a phosphorous material that is per se adapted to emit a greater given color intensity than that matched by said different color emitting phosphor elements, (b) placing said suspension onto said inner surface after said different color emitting phosphor elements have been deposited, (c) allowing a time interval for sedimentation of said phosphor material onto said inner surface in accordance with said predetermined pattern, (d) formulating a second aqueous suspension of a luminance control material, which in cooperation with the color emitted by said first phosphor material emits the given color in a resultant luminance that is matched in predetermined luminance by said different color emitting phosphors, and admixing said second aqueous suspension with said first aqueous suspension, (e) allowing a time interval for sedimentation of said luminance control material to substantially superimpose said phosphor material, (f) removing said first and second suspension while retaining the phosphor material and luminance control material on said screen, (3) coating said materials with a photosensitive organic solid-film-forming binder and hardening said binder by direct exposure to actinic light, and (4) washing the inner surface with an aqueous solvent to remove said materials deposited on said different color emitting phosphor elements.

16. The method of claim 15 including step (5) providing a metallic backing layer on the phosphor elements.

17. The method of claim 15 wherein the first aqueous suspension contains $Y_2O_3$:Eu in an amount substantially equal to 0.001 to 1.0% by weight of said suspension.

18. The method of claim 15 wherein the second aqueous suspension contains a member selected from the group consisting of $Zn_3(PO_4)_2$:Mn and (ZnCd):Ag in an amount substantially equal to 0.0001 to 1.0% by weight of said suspension.

19. The method of claim 15 wherein (a) the phosphor material has a given color emission that is substantially more intense but less prolonged in luminance, and (b) the luminance control material has a given color emission that is substantially less intense and more prolonged in luminance, as compared to the combined luminance of (a) and (b) that effect a matching of the predetermined luminance of the different color emitting phosphor elements 20. A color screen cathode ray tube comprising a substratum, and separate phosphor elements in a predetermined pattern on such substratum for separately emitting, in predetermined matching luminance, different colors, the phosphor elements thereof for a given color being formed of a plurality of phosphor materials for such given color, including a first phosphor material that is per se adapted to emit inherently greater luminance of such given color than the aforesaid matching luminance and a second luminance control phosphor material for such given color substantially coextensively mounted on such substratum with the first phosphor material and cooperating therewith to effect such predetermined given color matching luminance emitted by the combined first and second phosphor material.

21. The color screen of claim 20 wherein (1) the first phosphor material has a given color emission that is substantially more intense but less prolonged in luminance, and (2) the control phosphor material has a given color emission that is substantially less intense and more prolonged in luminance, as compared to the combined luminance of (1) and (2), said combined luminance matching the predetermined luminance of the other colored phosphor elements.

22. In a color cathode ray tube including: a screen; electron beam means mounted internally of said cathode ray tube and spaced from said screen for directing an electron beam toward said screen; a plurality of color producing areas each including discrete elemental areas of different color emitting material, and each elemental area arranged to be bombarded by said electron beam; the improvement therein comprising: one of said elemental areas being formed by a layer predominately of rare-earth phosphor material adjacent said screen, and a layer pre-dominately of luminance control material overlying said rare-earth phosphor.

23. The color cathode ray tube of claim 22, wherein said rare-earth phosphor material and said luminance control material emit red light when bombarded by said electron beam.

24. The color cathode ray tube of claim 22 wherein said rare-earth phosphor material comprises $Y_2O_3$:Eu.

25. The color cathode ray tube of claim 22 wherein said rare-earth phosphor material comprises $YVO_4$:Eu.

26. The color cathode ray tube of claim 22 wherein said rare-earth phosphor material comprises $Y_2O_3$:Eu, and wherein said luminance control material comprises ZnCdS:Ag.

27. The color cathode ray tube of claim 26 wherein said rare-earth phosphor material $Y_2O_3$:Eu is 40% to 50% of the combined total of the red emitting phosphors.

28. The color cathode ray tube of claim 22 wherein said rare-earth phosphor comprises $Y_2O_3$:Eu, and wherein said luminance control material comprises $$Zn_3(PO_4)_2:Mn$$

29. The color cathode ray tube of claim 28 wherein said rare-earth phosphor $Y_2O_3$:Eu is 50% to 60% of the combined total of the red emitting phosphors.

30. The color cathode ray tube of claim 22 wherein said rare-earth phosphor comprises $Y_2O_3$:Eu, and wherein said luminance control material is $Zn_3(PO_4)_2$.

31. The color cathode ray tube of claim 30 wherein said rare-earth phosphor $Y_2O_3$:Eu is 65% to 75% of the combined total of the material which makes up the red emitting material.

32. The color cathode ray tube of claim 22 further including photosensitive resin overlying said luminance control material for binding said rare-earth phosphor and said luminance control material to said screen; and a metallic backing positioned over said color producing areas.

33. The color cathode ray tube of claim 22 wherein said rare-earth phosphor and said luminance control material produce a combined light intensity between 540 and 580 luxes.

34. The color cathode ray tube of claim 22 wherein said rare-earth phosphor and said luminance control material have a combined persistence between 20 and 30 milliseconds.

References Cited
UNITED STATES PATENTS

| | | | |
|---|---|---|---|
| 3,198,634 | 8/1965 | Payne | 117—33.5 XR |
| 3,231,775 | 1/1966 | Pritchard | 117—71 XR |
| 3,275,466 | 9/1966 | Kell | 117—33.5 |
| 3,308,326 | 3/1967 | Kaplan | 117—33.5 XR |
| 3,330,981 | 7/1967 | Aia | 117—33.5 XR |
| 3,348,924 | 10/1967 | Levine et al. | 117—33.5 XR |
| 3,360,674 | 12/1967 | Mikus et al. | 313—92 XR |
| 3,360,675 | 12/1967 | Mikus et al. | 313—92 XR |
| 3,382,393 | 5/1968 | Schwartz | 313—92 |

ALFRED L. LEAVITT, *Primary Examiner.*

W. F. CYRON, *Assistant Examiner.*

U.S. Cl. X.R.

117—70; 178—5.4; 252—301.4; 313—92